April 9, 1957 J. KARMAZIN, JR 2,787,827
METHOD OF PRODUCING TUBING
Filed Dec. 13, 1951

INVENTOR.
John Karmazin Jr.
BY
His Attorney

United States Patent Office 2,787,827
Patented Apr. 9, 1957

2,787,827
METHOD OF PRODUCING TUBING
John Karmazin, Jr., Grosse Ile, Mich.
Application December 13, 1951, Serial No. 261,468
3 Claims. (Cl. 29—477.7)

This invention relates to metal coated metallic products and the method of manufacturing the same and more particularly to the method of manufacturing steel products, such as steel tubing that is coated with an alloy, although not necessarily so limited.

In the past several methods have been used in manufacturing steel tubing that is copper coated and wherein copper is used as a brazing material. One of these methods employs the use of powdered carbon. It seems that this carbon functions as a carrier for the melted copper, causing this copper to be uniformly distributed over the surface. The carbon, however, has a deleterious effect, especially when entering into the formation of a seam.

It has been found that some types of tubing manufactured by this process may be expanded approximately 20% before failure. In my copending application Serial No. 200,511, filed December 12, 1950, now abandoned, for Copper Coated Steel Products and the Method of Manufacturing the Same, a process has been disclosed wherein the copper coating is applied without the use of carbon.

In this diclosure the iron surface has been roughened by the shot blast process wherein the irregular surface on the iron prevents puddling of the copper. In other words, by roughening this surface and removing all foreign matter, capillary attraction is used to form a uniform or substantially uniform coating for the iron or steel products.

It is an object of the method disclosed herein to utilize either copper or copper and iron particles in powder or dust form to form a brazing for the seam of the tubing and to form a coating for the tubing.

Another object of this invention is to supply the copper or copper and iron particles, as the case may be, to the interior of the tubing with a lubricant, which lubricant is later removed from the interior of the tubing without removing the copper or copper and iron particles, so as to remove as far as possible all traces of the lubricant.

Another object of this invention is to provide a copper and iron brazing material and coating, which copper and iron forms an alloy, increasing the strength of the tubing and increasing the elasticity thereof, so that the tubing may be expanded.

Other objects and advantages reside in the construction of parts, the combination thereof and the mode of operation, as will become more apparent from the following description.

In the drawings:

Figure 1 discloses part of the apparatus used in forming the tubing from sheet stock taken substantially on the section line 1—1 of Figure 2 but having the tubing material omitted therefrom.

Figures 3 and 4 are drawn on a larger scale than Figure 2.

Figure 4:
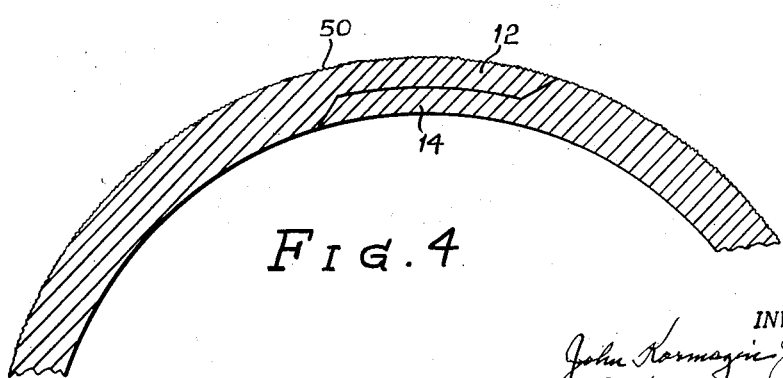
Figure 4 is a fragmentary cross sectional view of the tubing preparatory to the brazing operation.

The arrangement of the rollers and the mandrel is similar to apparatus now generally used in forming tube stock from sheet material. The sheet material 10 is first provided with reduced marginal portions 12 and 14. The reduced portion 12 terminates in a beveled edge 16 and is subtended by a beveled surface 18. The reduced flange 14 is provided with a beveled edge 20 and is subtended by a beveled surface 22. It is to be noted that the angle between the beveled surface 16 and the outer surface of member 10 is smaller than the angle formed between the beveled surface 20 and what later becomes the inner surface of the finished tube. Likewise, it is noted that the angle between the flange 12 and the beveled surface 18 is less than the angle between the flange 14 and the beveled surface 22. These angles have been accurately ascertained, so as to form a snug seat or seam between the flanges 12 and 14 after passing through the rollers and formed into the curved shape shown in Figure 4.

Figure 1:
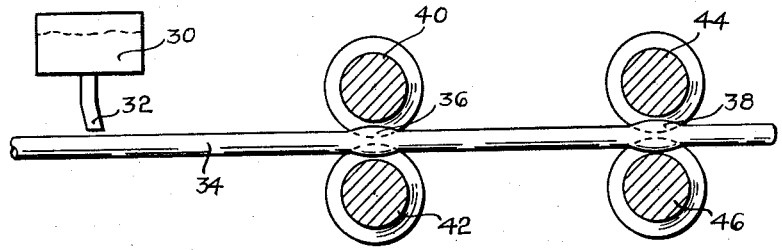
Figure 1 is drawn on a smaller scale than Figure 2.
Figure 2:
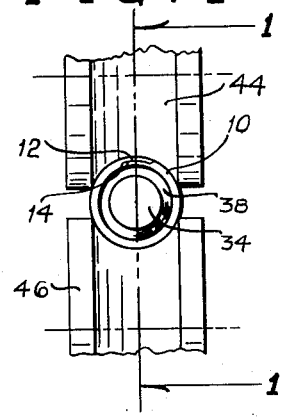
Figure 2 is an end view of the mandrel for the tubing and a portion of the rollers used in forming the tubing.
Figure 3:
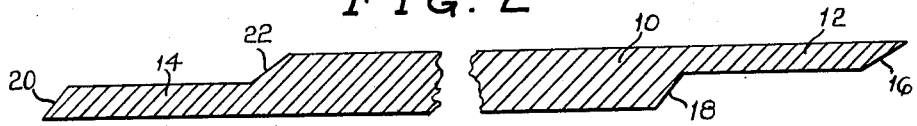
Figure 3 is a cross sectional view of a strip of material partially formed in readiness for the rollers.

Only two pairs of rollers have been disclosed in Figure 1. As is well known to those skilled in the art, there are a comparatively large number of pairs of rollers gradually deflecting the sheet material from the flat shape into a circular form like that shown in Figure 4. When the sheet material has been partially curved, a lubricant is supplied to the interior of the strip of sheet material, such as iron or steel, which lubricant is supplied from a reservoir 30 shown schematically in Figure 1 and provided with a spout 32. The lubricant has added thereto particles or granules of copper, either with or without particles or granules of iron. For the purpose of description, both copper and iron will be referred to, although the iron particles may be omitted in some cases.

The lubricant functions as a carrier for the metallic particles of copper and iron. It is customary to use a lubricant when forming tubing. As is well known to those skilled in the art, the lubricant reduces friction and also aids in the forming of the tube, that is, it aids in the rolling operation.

The mandrel 34 is provided with enlarged portions or swimmers 36 and 38 between the two pairs of forming rollers 40 and 42 and 44 and 46 respectively. In this process the swimmers 36 and 38, and particularly the swimmer 38, in addition to forming a mandrel for the sheet metal or the tubing, also functions as a wiper or drier, eliminating the lubricant from the interior of the tube after it has passed between the forming rollers 44 and 46, in that a great amount of pressure is applied to the rollers 44 and 46 so as to firmly squeeze the sheet metal against the periphery of the swimmer 38. The swimmer 38 also has another function. The metallic particles entering the bight formed between the swimmer and the sheet metal of the tubing will not flow back like the lubricant and be retained on one side of the swimmer, but will be carried past the swimmer 38. This results in the metallic particles being partially embedded so as to score the inner margin of the tubing. Also some of these particles will be partly flattened out or ironed out, due to the tremendous amount of force applied by the rollers 44 and 46 on the outside of the tubing. The particles of metal, both copper and iron, will have a tendency to adhere to the inner surface of the tubing with practically all traces of the lubricant being removed.

The contacting surfaces of the flanges 12 and 14 and the beveled surfaces 16 and 20 and 18 and 22 will also have lubricant and metallic particles applied thereto, so as to be coated. The lubricant in the seam between the flanges 12 and 14 is squeezed out of the seam when the tubing passes between the rollers 44 and 46. The metallic particles do not flow like the lubricant, and that being the case, the metallic particles will be embedded in the seam between the flanges 12 and 14 in readiness for the brazing operation. There may be a trace of lubricant, but the amount of lubricant will be very small, so as to have practically no deleterious effect upon the finished product.

After the tubing passes beyond the rollers 44 and 46, the outer surface of the tubing is treated with a shot blast containing particles of copper and/or particles of steel. Three things happen during this shot blast process. All of the lubricant is removed, the outer surface of the tubing is roughened as illustrated by the serrated edge 50 in Figure 4, and particles of copper and steel will adhere to the roughened outer surface of the tubing. A shot blast using copper alone gives excellent results. It is quite important to leave the powder on the tube after the roughening operation.

The tubing is now ready to be passed through the brazing furnace. This furnace is preferably of the type which is provided with a non-oxidizing atmosphere, such as the type commonly used in hydrogen brazing operation. Additional powdered copper and iron may be added to the exterior of the tubing as it is fed into the furnace, so as to provide a uniform coating. This roughened surface eliminates the necessity of using powdered carbon for causing the copper to form a uniform coating, in that the copper evidently is uniformly applied to the surface through capillary attraction.

The brazing furnace may be held at a temperature of about 2050° F. with copper melting at about 1980° F. When the tubing is heated to a temperature of 2050° F., the liquid copper is attracted by capillary attraction caused by the roughened surface, so as to be uniformly distributed on the surface of the tubing. The copper flows into the pores of the steel and forms an alloy stronger than the copper itself.

The joint or the seam between the flanges 12 and 14 is brazed or welded together by means of copper and iron alloy without any appreciable amount of carbon being present. The interior of the tubing is also coated with a copper and iron alloy. Due to the iron particles having the same melting point as the metal forming the tubing, it may be that the iron particles are merely sintered. The product produced in this manner is much stronger and has much greater elasticity than products utilizing carbon to cause the copper to flow and form a uniform coating. The seam is stronger and for some reason the entire tube seems to have greater elasticity, in that some specimens of the tubing manufactured by this process have been expanded as much as 60% without failure. In regular production an expansion of 40% gives excellent results.

Although the process has been described in connection with the manufacture of copper coated steel tubing, the process of applying and forming a copper coating may be applied to the manufacture of other products. Furthermore, the method is applicable to the coating of metallic articles other than steel. It may be used in coating and brazing other metals having a higher melting point than the melting point of the metal used in forming the coating.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. The method of forming a tubular member from an initially substantially flat strip of sheet metal which includes the steps of forming reduced thickness flanges on the longitudinal marginal portions of the strip of sheet metal, progressively bending the initially flat sheet metal strip into a transversely curved contour, applying metallic particles having a melting point lower than the melting point of the sheet metal strip and suspended in a free flowing liquid vehicle to the inner surface of the curved strip, simultaneously exerting pressure on opposed portions of the outer and inner surfaces of the curved strip so as to remove the major portion of the liquid vehicle from the inner surface of the strip while lodging the metallic particles on said inner surface and simultaneously forcing the flanges on the longitudinal marginal portions of the strip into overlapping contacting relationship with each other, and heating the tubular member so as to cause the metallic particles to coat the interior of the tubular member and seal the juncture between the flanges.

2. The method according to claim 1 wherein a steel sheet metal strip is utilized and wherein the metallic particles include particles of copper.

3. A method of forming a cylindrical tubular member from an initially flat strip of steel utilizing a plurality of forming rollers and a mandrel having an enlarged portion positioned between at least some of the rollers, the enlarged portions having a circular transverse cross-sectional area equal in size to the circular transverse cross-sectional area of the interior of the tubular member, said method including the steps of progressively bending the initially flat strip of steel into a transversely curved contour, applying copper particles suspended in a free flowing liquid vehicle having lubricating properties to the inner surface of the transversely curved strip, exerting a roller pressure on the outer surface of the strip so as to force the margins of the strip into contact with each other and to force the inner surface of the strip against the enlarged portion of the mandrel so as to remove the major portion of the liquid vehicle therefrom and embed the copper particles in said inner surface of the tubular member while permitting a portion of the liquid vehicle sufficient to lubricate the mandrel to remain on said inner surface, and heating the tubular member in a reducing atmosphere so as to cause the copper particles in the interior of the tubular member to form a coating on the inner surface of the tubular member and also seal the juncture between the margins of the tubular member.

References Cited in the file of this patent

UNITED STATES PATENTS

| | | |
|---|---|---|
| 448,594 | Smith | Mar. 17, 1891 |
| 1,431,368 | Bundy | Oct. 10, 1922 |
| 1,892,607 | Bundy | Dec. 27, 1932 |
| 1,938,633 | Maskrey | Dec. 12, 1933 |
| 2,092,018 | Quarnstrom | Sept. 7, 1937 |
| 2,156,952 | Morsing | May 2, 1939 |
| 2,210,338 | Quarnstrom | Aug. 6, 1940 |
| 2,252,776 | Losee | Aug. 19, 1941 |
| 2,408,515 | Hopkins | Oct. 1, 1946 |
| 2,414,923 | Batcheller | Jan. 28, 1947 |
| 2,449,662 | Leeson | Sept. 21, 1948 |
| 2,475,566 | Karmazin | July 5, 1949 |
| 2,631,949 | Kronthal | Mar. 17, 1953 |

FOREIGN PATENTS

| | | |
|---|---|---|
| 347,723 | Great Britain | May 4, 1931 |

OTHER REFERENCES

General Electric Publication GEA-3193C, a compilation of articles published in Iron Age during 1938 and 1939, pages 12, 17 to 22 and 25-30.